(No Model.)
H. A. BARBER.
CENTRIFUGAL PUMP.
No. 526,339. Patented Sept. 18, 1894.
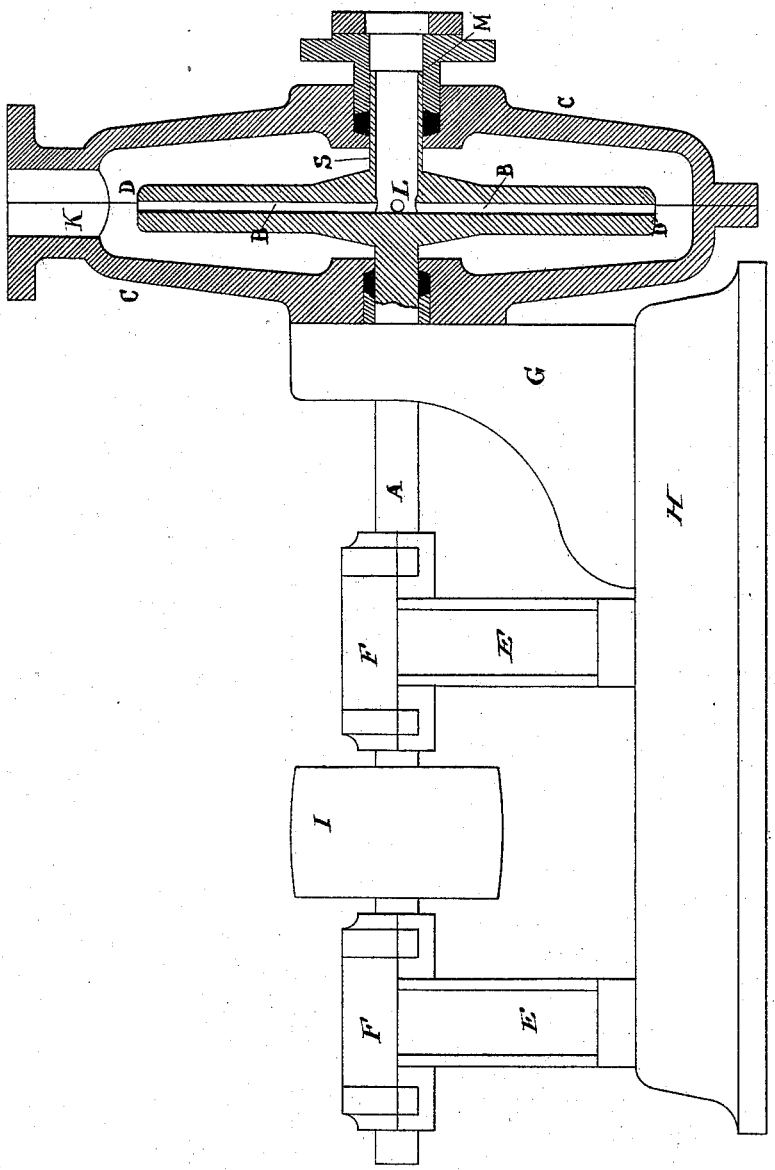
WITNESSES:
INVENTOR
Henry A. Barber
BY
Fenelon B. Brock
ATTORNEY.

UNITED STATES PATENT OFFICE.

HENRY A. BARBER, OF WATERTOWN, NEW YORK, ASSIGNOR OF ONE-HALF TO ALBERT H. LEFEBVRE, OF SAME PLACE.

CENTRIFUGAL PUMP.

SPECIFICATION forming part of Letters Patent No. 526,339, dated September 18, 1894.

Application filed November 27, 1893. Serial No. 492,130. (No model.)

*To all whom it may concern:*

Be it known that I, HENRY A. BARBER, a citizen of the United States, residing at Watertown, in the county of Jefferson, State of New York, have invented certain new and useful Improvements in Centrifugal Pumps; and I do declare the following to be a full, clear, and exact description of the invention, such as will enable others skilled in the art to which it appertains to make and use the same, reference being had to the accompanying drawing, and to the letters of reference marked thereon, which form a part of this specification.

The invention relates to pumps.

The drawing represents a partial elevation and partial section of a pump embodying my invention.

The invention comprises the following construction and combination of elements which I shall proceed to describe so that the invention may be understood by those skilled in the art, and then point out and claim the novel features thereof.

In the drawing—C represents an annular casing containing a similarly shaped chamber. This casing has axial bearings provided with suitable stuffing boxes in which is mounted the rotary piston D.

A is the rotary shaft of the piston carried loosely in standards E, having bearings F, and the abutment block G—all of which are preferably supported by a bed or foundation H.

I is the driving pulley of the pump keyed to shaft A. The revolving hollow axial inlet S of the pump is a virtual prolongation of shaft A.

K is the peripheral discharge opening. This piston D is preferably a solid disk, attached in any approved way to the shaft, and is of smooth exterior finish so as to minimize skin friction.

B are a series of radial passages extending from the circumference to the center of the piston all of which converge and enter the central inlet L of the shaft S.

The action of the disk piston is very complete and satisfactory. The fluid drawn in and discharged by it, even under very high pressures, permits no movement whatever of the fluid back into the piston. It is therefore unnecessary for the piston to fit the inclosing case in any degree; but, on the contrary, I have found it highly desirable to mount the piston so that an ample fluid space surrounds the piston. Such a construction reduces the friction to a minimum degree, and the piston is automatically balanced within the casing. This balancing is due to the slight rotary motion which is imparted to the fluid surrounding the smoothly finished rotary piston, such motion of the fluid being greater in proximity to the walls of the piston than in the immediate neighborhood of the casing walls.

In practice, in order to lessen friction it is desirable to make the diameter of the shaft A at the point where it is used as the axial inlet S larger than it is on the opposite end, permitting said inlet S to be of ample capacity for the quantity of fluid to be passed, and as it is well known in mechanics that such a construction will unbalance the moving parts, the piston is placed at one side of the center and, the unbalancing due to the enlarging of the shaft at S is counteracted.

To counteract the end thrust of the piston it is loosely placed in the case at one side of the center, away from the inlet or next the pulley, which position, in operation, causes a slight reduction of pressure between the side of the piston and the casing wall next the pulley sufficient to balance the shaft against the end thrust toward the inlet or suction of the pump. This reduction of pressure, resulting in a partial exhaustion or suction of the water, is caused by skin friction between the piston side and the casing next the pulley. The unbalanced pressure is due to the enlargement of the shaft on the suction side, acted upon principally by pressure in the case which often exceeds one hundred pounds per square inch. The suction of the pump inlet likewise acts in the same direction with the unbalanced pressure due to the difference in diameter of the shaft.

The limits of endwise motion of the loosely mounted shaft are defined by any suitable means. Such limitation does not interfere with my piston finding its natural balancing position in the case, and at the same time being held to one side of the casing.

Any number of small radial passages may be made in the piston, according to the nature of the work and service required.

The work of my centrifugal pump is of such a high order that it will perform the work usually and ordinarily possible only with positive action pumps, such as the reciprocating piston variety.

The usual centrifugal pump will raise water practically to a height of less than a hundred feet and even at such a limit two centrifugal pumps are preferably used, allowing the speed to remain below a point where the efficiency becomes as small as it does at the high speeds required for lifts greater than fifty feet. This loss of efficiency in the ordinary centrifugal pump when attempting to pump against high pressure is due, in a great measure, to the fact that the fan, wing or piston (so called) cannot be a perfect fit in its containing case, and a large percentage of the liquid impelled by centrifugal force from the periphery of the wing finds its way back to the center of the wing, there to be again given motion, wasting a large amount of power. Another source of loss of efficiency is due to the action of the arms on the fan, wing or piston being unbalanced that portion of the liquid in contact with the arm, being given one pressure while the liquid farther removed receives a gradually decreasing pressure, resulting in an eddying motion which absorbs and wastes a large amount of power.

The drawing shows one way of carrying out my invention. To the skilled mechanic, with this disclosure before him, other equivalent and obvious means employing my method of operation can be produced. I desire to state, therefore, that the essence of my invention does not reside in any specific means for effecting the result, but in the generic application of the features and methods herein pointed out.

I claim—

1. The combination of a pump casing, a discharge opening and an axial inlet therefor, a rotary piston mounted in the casing at one side of the center opposite or away from the inlet, and a shaft upon which the piston is hung loosely mounted for endwise movement.

2. The combination of a pump casing having inlet and outlet passages, a rotary shaft hung therein loosely mounted for endwise movement, having an enlarged hollow inlet, a stuffing box surrounding said hollow inlet, and a piston mounted upon the shaft at one side of the center of the casing opposite the inlet.

In testimony whereof I affix my signature in the presence of two witnesses.

HENRY A. BARBER.

Witnesses:
 GEORGE ADAMS,
 PHI NORTON.